J. TARDOS, Jr.
APPARATUS FOR TREATING TALLOW, OIL. &c.
No. 171,328.　　　　　　　　Patented Dec. 21, 1875.
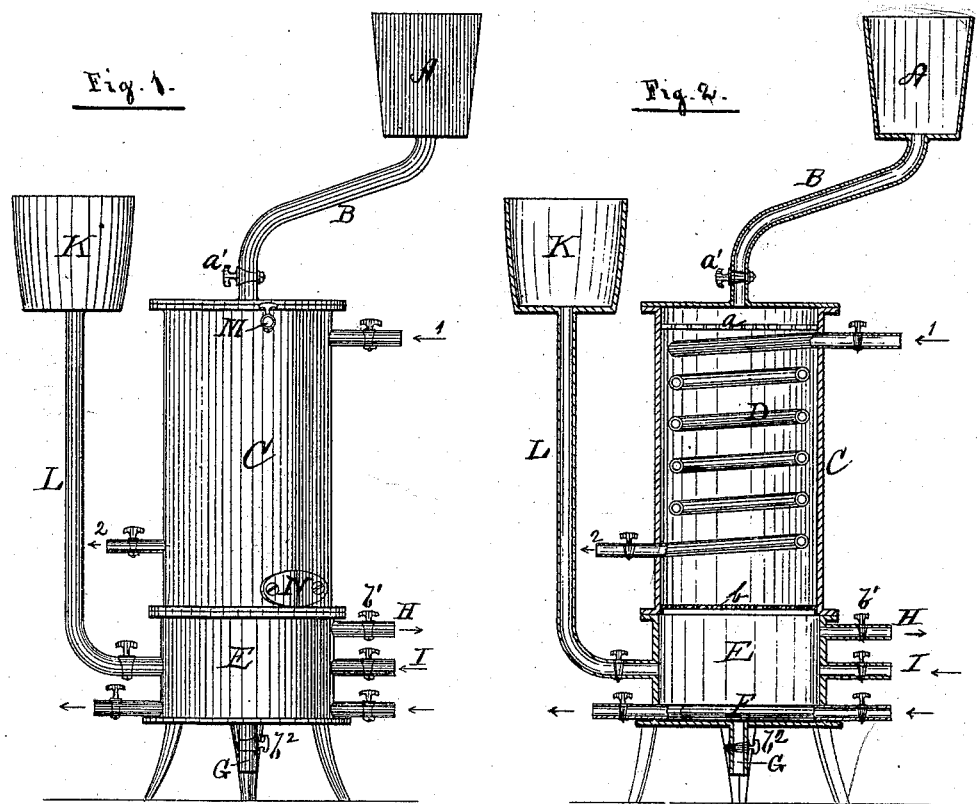

UNITED STATES PATENT OFFICE.

JULES TARDOS, JR., OF NEW ORLEANS, LOUISIANA.

IMPROVEMENT IN APPARATUS FOR TREATING TALLOW, OILS, &c.

Specification forming part of Letters Patent No. 171,328, dated December 21, 1875; application filed November 6, 1875.

*To all whom it may concern:*

Be it known that I, JULES TARDOS, Jr., a resident of the city of New Orleans and State of Louisiana, have invented a certain new and useful Improvement in Apparatus and Process for Treating Tallow, Oils, Sirups, &c.; and I do hereby declare the following to be a full, clear, and correct description of the same, reference being had to the annexed drawing, making a part of this specification.

My invention relates to a simple and compact apparatus, in which the filtering and decolorizing of tallow, oils, sirups, &c., is effected by causing the same to pass through heated charcoal or bone-black.

The accompanying drawing clearly illustrates my improved apparatus, of which the following is a description:

Figure 1 represents a front elevation, and Fig. 2 a longitudinal sectional view, of the same.

A is a reservoir for containing the tallow, oil, or sirup to be defecated. Although not shown on the drawing, this reservoir may be provided with a steam pipe or worm for the purpose of melting the tallow, or of so heating the contents of the reservoir that the said contents may readily flow down through the pipe B into the filtering-vessel C, within which is constructed a steam pipe or coil, D, through which steam is made to flow in the direction shown by the arrows 1 and 2. The heat from this pipe is imparted to the charcoal or bone-black with which it is surrounded; hence causing a more rapid and perfect filtration through the same. At the bottom and near the top of the filtering-vessel C I employ perforated plates or strainers *a* and *b*, covered with pieces of blanket or woolen goods, so as to effectually retain the filtering material between them. Of course, when this cleansing process is going on, the stopcocks $a^1$ $b^1$ $b^2$ are shut off, the filtered and decolorized material having first been drawn off. E is a receiving-tank, which is bolted or otherwise secured to the bottom of the filtering-vessel C, so as to receive the purified liquid as it drips from the bottom strainer thereof. The bottom of this vessel is provided with a steam-pipe, F, the steam of which keeps the filtered material in a liquid state until drawn off through the pipe G. This vessel is also provided with an air-exit pipe, H, and a direct steam-pipe, I.

In order that the charcoal or bone-black may be thoroughly washed and freed of all feculent matter without the trouble and expense of removing the same, I provide the apparatus with a water-tank, K, which is placed at an elevation somewhat above the top of the filtering-vessel, so that the water contained within the same may, by means of a pipe, L, be conveyed to the receiving-tank E, in which it is heated by steam from the pipe I and coil F. This water, from the pressure in the pipe L and tank K, naturally rises and passes up through the filtering material, carrying with it all the dirt and foreign matter and discharges the same, at a point above the upper strainer, through a pipe which is clearly shown at M in Fig. 1. The filtering-vessel C is provided, at a point immediately above the lower strainer, with a man-hole, N, so that its interior may be cleaned and repaired whenever necessary.

Having described my invention, what I claim as new, and desire to secure by Letters Patent, is—

1. The filtering-vessel C, provided with strainers *a b*, and filled with charcoal or bone-dust between said strainers, the charcoal or bone-dust having passed through its mass the steam pipe or worm D, to heat the same, substantially as described, as and for the purpose specified.

2. The combination, with the filtering-vessel C, of a reservoir, A, and pipe B, and of a receiving-tank, E, the latter provided with a steam pipe or worm, F, direct steam-pipe I, air-exit pipe H, and discharge-pipe G, as described, and for the purpose specified.

3. The combination of the filtering-vessel C, receiving-tank E, steam-pipe I, worm F, water-tank K, pipe L, and exit-pipe M, the whole arranged to operate substantially as described.

This specification signed this 29th day of October, 1875.

JULES TARDOS, JR.

Witnesses:
ANDREW HERO, Jr.,
H. N. JENKINS.